Dec. 19, 1961     O. F. CAMPBELL ET AL     3,013,773
HEAT EXCHANGE APPARATUS
Filed Oct. 11, 1954     2 Sheets-Sheet 1
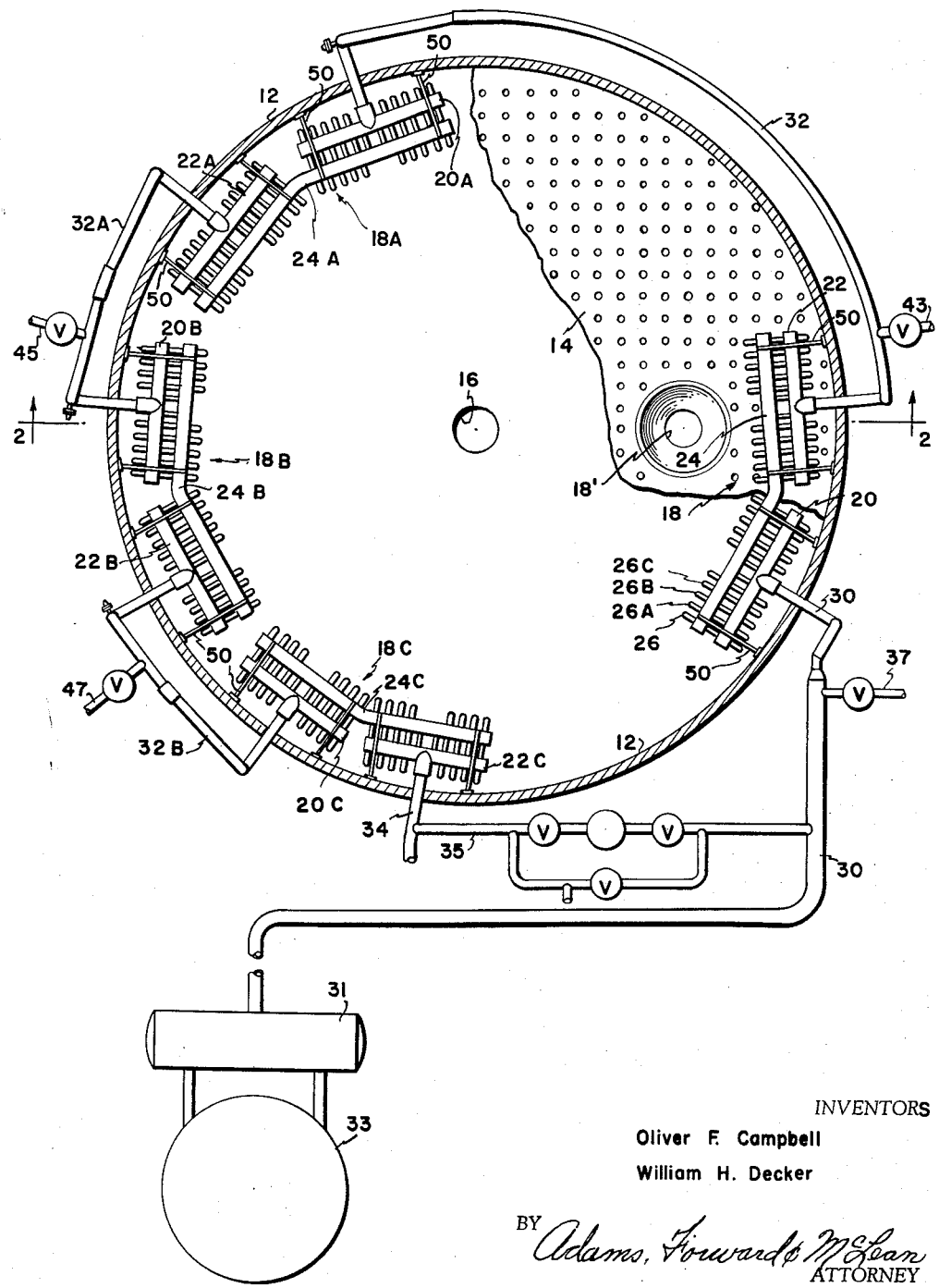
INVENTORS
Oliver F. Campbell
William H. Decker
BY Adams, Forward & McLean
ATTORNEY Dec. 19, 1961    O. F. CAMPBELL ET AL    3,013,773
HEAT EXCHANGE APPARATUS
Filed Oct. 11, 1954    2 Sheets-Sheet 2
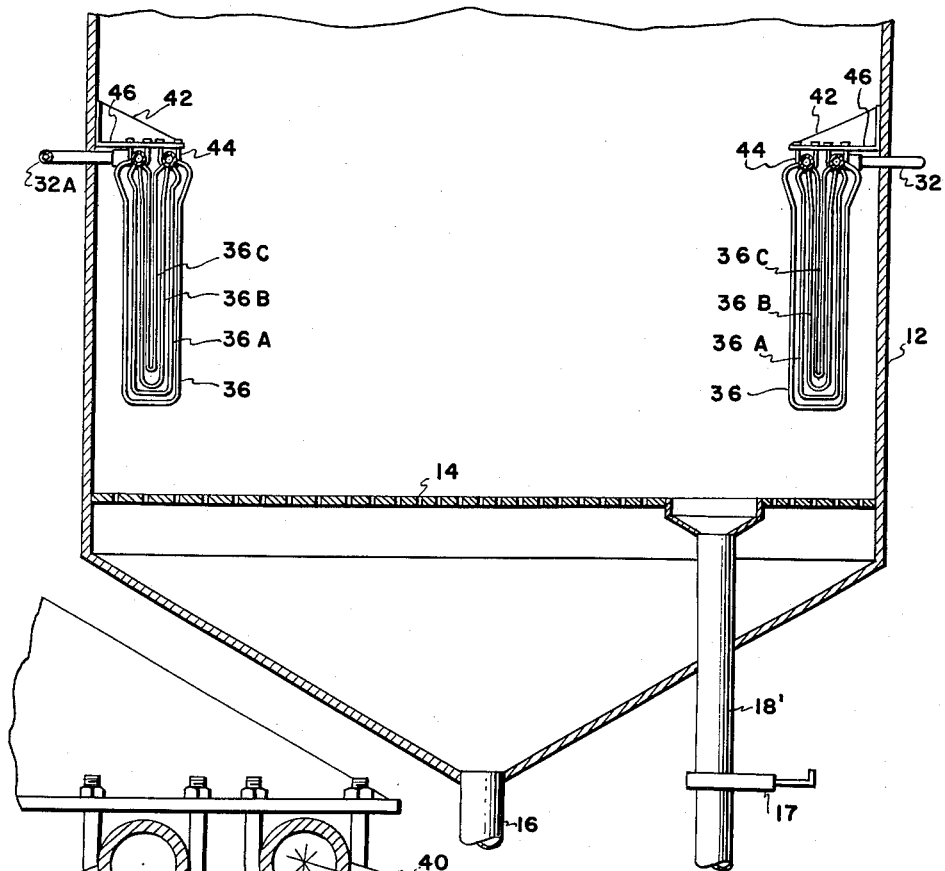
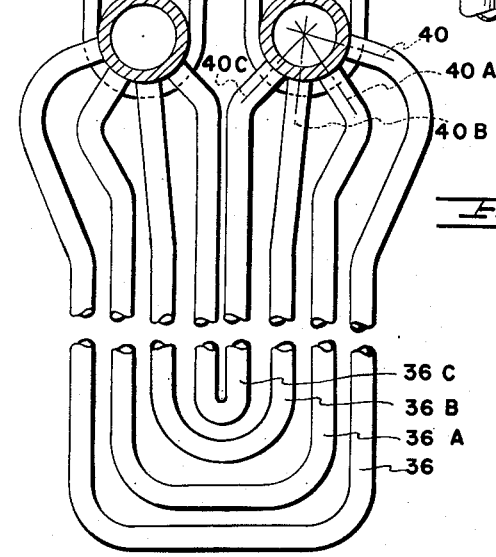
INVENTORS
Oliver F. Campbell
William H. Decker
BY *Adams, Forward & McLean*
ATTORNEY

United States Patent Office 3,013,773
Patented Dec. 19, 1961

3,013,773
HEAT EXCHANGE APPARATUS
Oliver F. Campbell and William H. Decker, Whiting, Ind., assignors to Sinclair Refining Company, New York, N.Y., a corporation of Maine
Filed Oct. 11, 1954, Ser. No. 461,346
2 Claims. (Cl. 257—221)

This invention relates to improvements in catalyst regenerator units which are used in conjunction with fluid catalyst conversion systems. More particularly, this invention relates to novel cooling coil means and to a combination of regenerator and cooling coil means for removing heat from a bed of solid catalyst particles undergoing regeneration by combustion of carbonaceous deposits from the catalyst surface while handling the catalyst as a fluidized bed.

Coke deposits which form on catalyst particles during conversion processes adversely affecting activity and selectivity must be removed from the particles if economic conversion is to be maintained. Normally, coke-containing catalyst particles are transferred to a regenerator where the coke is removed by burning with an oxygen-containing gas, e.g., air. The burning of coke from the catalyst releases tremendous quantities of heat. Part of this heat passes out of the regenerator with the products of combustion. Another part is removed by catalyst circulation from the regenerator to the reactor since the catalyst enters the regenerator at about 900° F. and leaves at about 1100° F. The balance of the heat must be removed by other means or the temperature in the regenerator would rise to well above 1100° F.; this would sinter and deactivate the catalyst permanently by effecting an area loss. Obviously then, one of the operating variables to be controlled on a fluid catalyst unit is the regenerator bed temperature.

The problems involved and the solutions suggested for regenerator bed temperature control are legion. By use and failure, by analysis and by economic consideration many proposals have been discarded. Other systems have found commercial use. For example, heat removal has been accomplished by withdrawing a portion of the catalyst from the bed undergoing regeneration and circulating it through a tubular waste heat boiler to cool it before return to the regenerator. Other systems proposed use heat exchange coils within the catalyst bed. Generally, such systems have employed coil extending throughout a large portion of the bed. An innovation which has attained commercial significance employs circumferentially disposed tubular cooling coils in the form of a reverse flow interrupted annulus (see copending application of Campbell Serial No. 262,289, filed December 18, 1951 now abandoned). Most systems known in the prior art may be analyzed to show certain disadvantages, some functional, others economic and still others of a nature collateral to, though dependent on, the use of the specific system. For example, special equipment uses valuable space and can be expensive; unnecessary catalyst circulation is expensive and especially so from the operational and maintenance standpoint due to erosive action in transfer lines and the extra valves, etc. Cooling systems using conventional internal cooling means face problems of serious differential expansion, support for the cooling means, special maintenance problems due to lessened accessibility, etc.

In the present invention we provide a novel heat exchange element especially suitable for internal use in conjunction with a fluid catalyst regenerator. We further provide a novel loop configuration in a tube bank employed for temperature control in fluid catalyst regenerators. We also provide a regenerator combination characterized by highly satisfactory temperature control, ease of control, substantial lack of erosion problems, ease of maintenance, simplified support problems and substantial absence of buckling and warping of the cooling coils due to differential expansion.

The heat exchange element of our invention is composed of a plurality of headers and a plurality of tube banks arranged to define loops pendant from said headers. The headers are in substantially the same horizontal plane with their horizontal axes generally paralleling one another. The preferred form of our novel heat exchange element employs three headers, being an inlet header, an outlet header and an intermediate header. In the preferred embodiment, the inlet and outlet headers are desirably placed in an end-to-end relationship and the ends spaced slightly apart. To conform to the normal curvature of a regenerator wall, the inlet and outlet headers can be placed so that each is substantially tangent to the same imaginary circle having its center at the center of the regenerator. The intermediate header, which generally is about equal in length to the combined length of the inlet and outlet headers associated with it, is adjacent to and spaced from the inlet and outlet headers and has its horizontal axis in substantially the same plane as the other headers. The intermediate header can be deformed to define an obtuse angle in order that each of its ends will be substantially parallel to the inlet or outlet header adjacent that end.

The heat exchange element contains a plurality of tube tanks having several loops in each bank. The tube banks, preferably about 20 in each unit, connect the intermediate header with the inlet and outlet headers. The tube banks, containing a plurality number of loops preferably, are pendently supported from the headers with the loops initially defining generally radial planes from the headers. In the preferred form of the invention, half of the banks employed connect the inlet header to the intermediate header, and the remaining banks connect the outlet header with the intermediate header. This arrangement permits serial flow of heat exchange medium into the inlet header through the radially disposed loops connected thereto into the intermediate header and then through the remaining loops into the outlet header.

The heat exchange elements of this invention are especially advantageous, in combination with a regenerator, as means for controlling regenerator bed temperature. A characteristic of fluidized beds is the substantial uniformity of bed temperature throughout. Hence a heat exchange element at any place in a bed normally will be as effective as any other location when considered solely as regards heat exchange efficiency. In our combination we prefer to locate a plurality, usually four in number, of the novel heat exchange elements in the regenerator and connect them serially through external conduits; the outlet of the first heat exchanger is connected to the inlet of the second and so on. The heat exchangers are circumferentially spaced and are supported inside the regenerator by separate wall brackets clamped to the headers. External serial connection of the separate units also facilitates the use of by-pass conduits whereby sensitive bed temperature control can be obtained by permitting the insertion or removal of an element. This arrangement has the additional advantage of permitting easy adaptation of respray operation in order that fluctuations in capacity can be made without necessity of changing design. Thus, if more heat must be removed, additional steam or condensate can be injected into the circuit as desired, for example, between the second and third grouping of elements or between each pair, i.e., 3 resprays for a four element regenerator.

Our invention will be further described in connection with the appended drawings in which:

FIGURE 1 is a plan view of our regenerator combination;

FIGURE 2 is a vertical section of the regenerator combination showing the pendent disposition of the loops in each tube blank; and FIGURE 3 is a vertical section of a heat exchange unit showing a preferred configuration of the radially spaced pendently disposed loops.

Referring to the drawings, the regenerator comprises a vertically elongated generally cylindrical shell 12 having a catalyst support grid 14, a catalyst riser 16, a standpipe 18′ provided with means 17 to supply fluidizing gas and conventional combustion gas outlet conduits, cyclone separators and the like (not shown). Circumferentially disposed about the periphery of the catalyst regenerator are a plurality of heat exchange units 18, 18A, 18B and 18C. The heat exchange units comprise inlet headers 20, 20A, 20B and 20C, outlet headers 22, 22A, 22B, and 22C, intermediate or distribution headers 24, 24A, 24B, and 24C, tube banks 26 and 26A through K for each inlet or outlet header. The heat exchange units are supported and connected to the regenerator shell 12, for example, by means of bracket supports 50. Inlet header 20 is supplied with a suitable heat exchange medium, preferably steam, by means of a conduit 30 which conducts the heat exchange medium from a suitable source, i.e., steam boiler 33 and steam drum 31 or a CO boiler (not shown). Heat exchange medium passes between the separate heat exchange units by means of conduits 32, 32A and 32B, each of said conduits being connected to one outlet header and one inlet header as shown. The heat exchange medium is led from the last outlet header via a conduit 34 to a storage tank for cooling and then is recycled, or it may be by-passed through conduit 35 and then into conduit 30 where it is cooled by steam entering from respray conduit 37. Respray conduits 43, 45 and 47 are provided in each external conduit connecting an outlet header with the succeeding inlet header to provide means to adjust the regenerator for capacity changes.

As shown more clearly in FIGURE 2 and FIGURE 3, the tube banks, each consisting of a plurality of loops, are pendently connected to two headers; about half of the tube banks in each heat exchange unit connect the inlet header to the intermediate header, and the remaining banks connect the intermediate header with the outlet header. Each tube bank is composed of a plurality of loops 36, 36A, 36B, 36C; while four are shown, more or less can be used as desired. At a point of contact between a conduit and a header we prefer to employ two loops in each tube bank to avoid complexity of structure. The loops are pendently supported in radial planes from the headers as indicated by 40, 40A, 40B and 40C on FIGURE 3 and thence downwardly to define loops as indicated by 36 through 36C. It is preferred to connect all of the loops at each header section to the lower half of the header section; that is, referring to FIGURE 3, loops 36 through 36C connect with the sections of headers so that all such connections are below a horizontal plane drawn through the center of the header section.

The heat exchange units preferably are spaced slightly away from the regenerator wall to provide space for contact of the fluid catalyst bed with all surfaces of the pendently disposed coils. The disposition of the coils downwardly along the regenerator wall permits free expansion and contraction without additional stresses and strains being placed on the regenerator wall or the support means. The pendent disposition of the loops in the tube banks avoids any necessity for spacer and complex supporting structure of the type characteristically employed in conjunction with common heat exchange coils. Supporting structure which can be employed for the present invention can be a wall bracket 50 as shown in FIGURE 2 having a triangular frame 42 provided with U-shaped supports 44 which extend from the horizontal member 46 of the wall bracket pass under the headers and then back to the horizontal member. For ease of maintenance and inspection it is preferred that the U-shaped supports provide support for the headers and tube banks without preventing lateral, horizontal or vertical movement responsive to heat shocks and the physical shock attending establishment of a fluidized bed.

From the foregoing it can be seen that we have provided tube banks, heat exchange elements and a fluid regenerator combination having highly desirable characteristics. For example, the tube bank arrangement of loops within loops provides maximum heat exchange surface for minimum space. Employing this type bank in a regenerator results in maximum heat transfer surface without significant disturbance of the fluid bed. In addition to the advantages noted throughout the disclosure, this novel regenerator combination is further advantageous in that the number of thermal sleeves ordinarily required for regenerators employing internal cooling coils has been materially reduced. Internal headers provide additional heat transfer surface whereas suspended tubular loops simplify support problems and are self cleaning.

We claim:

1. In a fluid catalyst regenerator of a fluid catalyst conversion unit, the combination of a vertically positioned regenerator chamber and a plurality of internally disposed catalyst heat exchange units each consisting essentially of an inlet header, an outlet header, an intermediate header and a plurality of tube banks, each of said tube banks comprising a plurality of tubular generally U-shaped coils defining a series of loops of increasing size in substantially the same vertical plane, the intermediate header extending along the length of the inlet and outlet headers and being horizontally elongated and having each end respectively parallel to said inlet and outlet headers, a first group of the plurality of tube banks disposed between and connecting the inlet and intermediate headers, a second group of the plurality of tube banks disposed between and connecting said intermediate and outlet headers, said units being circumferentially arranged around the periphery of said chamber in such a manner that a minor portion of the cross-section of the fluidized catalyst bed is traversed by said units, the plurality of internally disposed heat exchange units being serially connected by conduits generally external to the regenerator chamber, and support means extending from the regenerator chamber wall to said headers.

2. The regenerator combination of claim 1 wherein the tubular generally U-shaped coils of each tube bank communicate with the lower half of the header to which they are connected.

References Cited in the file of this patent

UNITED STATES PATENTS

| | | |
|---|---|---|
| 1,863,174 | Turner | June 14, 1932 |
| 1,883,309 | Lucke | Oct. 18, 1932 |
| 1,919,029 | Lucke | July 18, 1933 |
| 2,219,214 | Wilson et al. | Oct. 22, 1940 |
| 2,477,950 | Bailey | Aug. 2, 1949 |
| 2,640,686 | Brown | June 2, 1953 |

FOREIGN PATENTS

| | | |
|---|---|---|
| 129,842 | Australia | Nov. 5, 1948 |